(12) United States Patent
Pancotti et al.

(10) Patent No.: US 8,141,813 B2
(45) Date of Patent: Mar. 27, 2012

(54) HELICOPTER

(75) Inventors: Santino Pancotti, Gallarate (IT); Dante Ballerio, Caronno Varesino (IT); Attilio Colombo, Vergiate (IT)

(73) Assignee: Agusta S.p.A., Samarate (IT)

( * ) Notice: Subject to any disclaimer, the term of this patent is extended or adjusted under 35 U.S.C. 154(b) by 347 days.

(21) Appl. No.: 12/581,560

(22) Filed: Oct. 19, 2009

(65) Prior Publication Data

US 2010/0096492 A1  Apr. 22, 2010

(30) Foreign Application Priority Data

Oct. 21, 2008 (EP) ...................................... 08425680

(51) Int. Cl.
*B64C 27/00* (2006.01)
(52) U.S. Cl. .................. 244/17.27; 244/17.11; 416/500
(58) Field of Classification Search ............... 244/17.27, 244/17.11; 416/500; 248/559
See application file for complete search history.

(56) References Cited

U.S. PATENT DOCUMENTS

| 3,502,290 | A | * | 3/1970 | Legrand Louis Francois et al. ............................ 248/635 |
| 3,565,386 | A | | 2/1971 | Lemkuil et al. |
| 3,698,663 | A | | 10/1972 | Balke et al. |
| 3,920,202 | A | * | 11/1975 | Mouille ...................... 244/17.27 |
| 3,921,940 | A | * | 11/1975 | Mouille ...................... 244/17.27 |
| 4,111,386 | A | | 9/1978 | Kenigsberg et al. |
| 4,267,805 | A | | 5/1981 | Schmuck |
| 4,458,862 | A | * | 7/1984 | Mouille et al. ............. 244/17.27 |
| 4,720,060 | A | * | 1/1988 | Yana .......................... 244/17.27 |
| 5,190,244 | A | * | 3/1993 | Yana .......................... 244/17.27 |
| 6,283,408 | B1 | * | 9/2001 | Ferullo et al. .............. 244/17.27 |

FOREIGN PATENT DOCUMENTS

| FR | 2441902 | 6/1980 |
| GB | 2018942 | 10/1979 |

OTHER PUBLICATIONS

Search Report in European Application No. 08425680.9 dated Dec. 3, 2009.

* cited by examiner

*Primary Examiner* — Christopher P Ellis
(74) *Attorney, Agent, or Firm* — McCracken & Frank LLC

(57) ABSTRACT

A helicopter having a rotor, a fuselage, and a transmission connected functionally to the rotor; the helicopter has a supporting body supporting at least the transmission, and connecting means having a first connecting member and at least one second connecting member connected to the supporting body and the fuselage respectively; and the connecting means have elastic means interposed between the first and second connecting member.

8 Claims, 6 Drawing Sheets

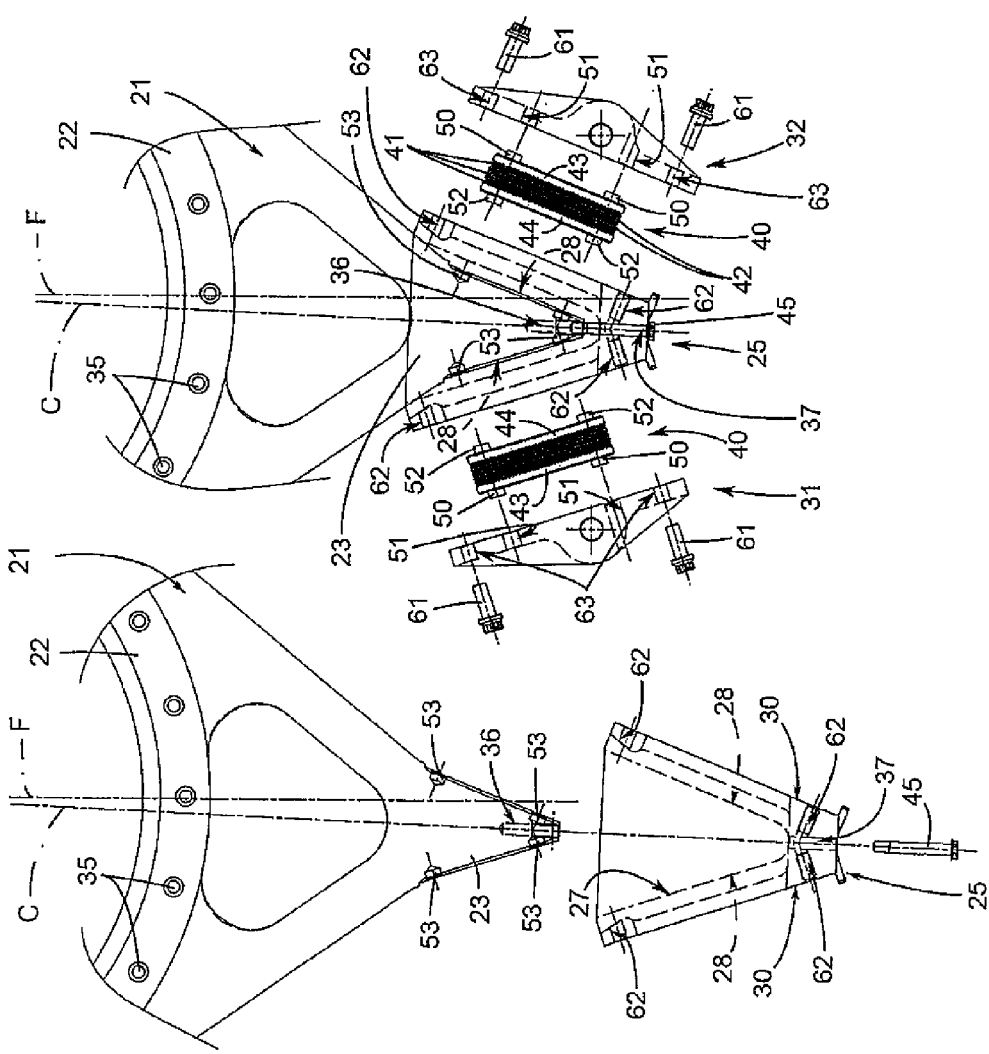

HELICOPTER

The present invention relates to a helicopter.

BACKGROUND OF THE INVENTION

The helicopter also comprises at least one engine; a transmission between the engine and the drive shaft; and a connecting device connecting the fuselage to a supporting body supporting the drive shaft and the transmission. In other words, the fuselage is "suspended" from the supporting body by the connecting device.

During normal operation of the helicopter, the engine exerts drive torque on the transmission. By the law of action-reaction, reaction torque is transmitted to the supporting body, and from there to the fuselage by the connecting device, and is balanced by an opposing torque exerted on the fuselage by the tail rotor.

The connecting device inevitably transmits vibration and noise to the fuselage and hence to the cabin, thus impairing the comfort of the crew.

A need is felt within the industry to minimize transmission of this vibration and noise to the cabin, particularly in predetermined frequency ranges.

SUMMARY OF THE INVENTION

It is an object of the present invention to provide a helicopter designed to achieve at least one of the above requirements cheaply and easily.

According to the present invention, there is provided a helicopter as claimed in the attached claims.

BRIEF DESCRIPTION OF THE DRAWINGS

A preferred, non-limiting embodiment of the present invention will be described by way of example with reference to the accompanying drawings, in which:

FIGS. 6 to 8 show successive steps in assembly of the FIG. 2-5 connecting device.

DETAILED DESCRIPTION OF THE INVENTION

Figure 1:
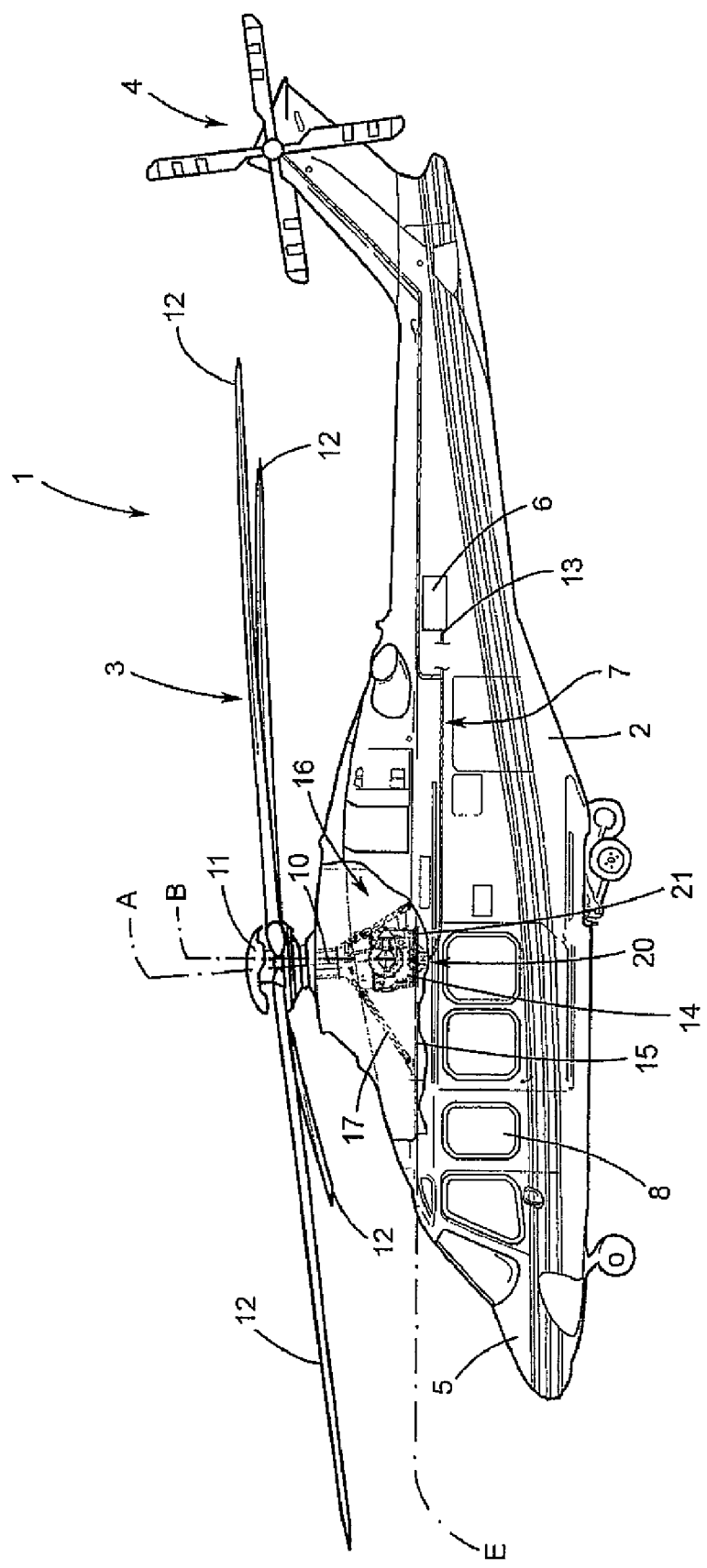
FIG. 1 shows a side view of a helicopter in accordance with the present invention.

Number 1 in FIG. 1 indicates a helicopter substantially comprising a fuselage 2 with a nose 5; at least one engine 6 (only shown schematically in FIG. 1); and a main rotor 3 mounted on top of fuselage 2 to generate the lift and thrust necessary to lift and move helicopter 1 forward.

Main rotor 3 substantially comprises a drive shaft 10; a hub 11 hinged to shaft 10; and a number of blades 12 hinged to hub 11 and extending in respective directions crosswise to an axis A of shaft 10.

Fuselage 2 defines a cabin 8 normally occupied by the crew and bounded, on the side facing main rotor 3, by a wall 15 of fuselage 2.

Helicopter 1 also comprises a transmission 7 (only shown schematically in FIG. 1) connecting an output member 13 of engine 6 functionally to shaft 10; and a stator body supporting member 13, transmission 7 and shaft 10 in rotary manner.

Of the stator body, FIG. 1 only shows a box 14 projecting from wall 15, on the opposite side to cabin 8, and supporting a final stage of transmission 7 and shaft 10 in rotary manner about axis A.

Helicopter 1 also comprises an antitorque tail rotor 4 projecting from a tail fin of fuselage 2 at the opposite end to nose 5; and connecting means 16 connecting box 14 to wall 15 of fuselage 2.

Connecting means 16 substantially comprise:

a number of—in the example shown, four—rods 17 extending, along respective axes sloping with respect to wall 15 and axis A, between a lateral surface of box 14 and respective fastening points to wall 15; and a connecting device 20 connected to a bottom edge of box 14 and to wall 15, and for transmitting reaction torque to fuselage 2.

More specifically, the reaction torque is, by the law of action and reaction, equal to and opposite the drive torque transmitted from engine 6 to shaft 10 by transmission 7, is transmitted to the stator body and hence to box 14, and is balanced by an opposing torque generated by tail rotor 4.

Figure 4:
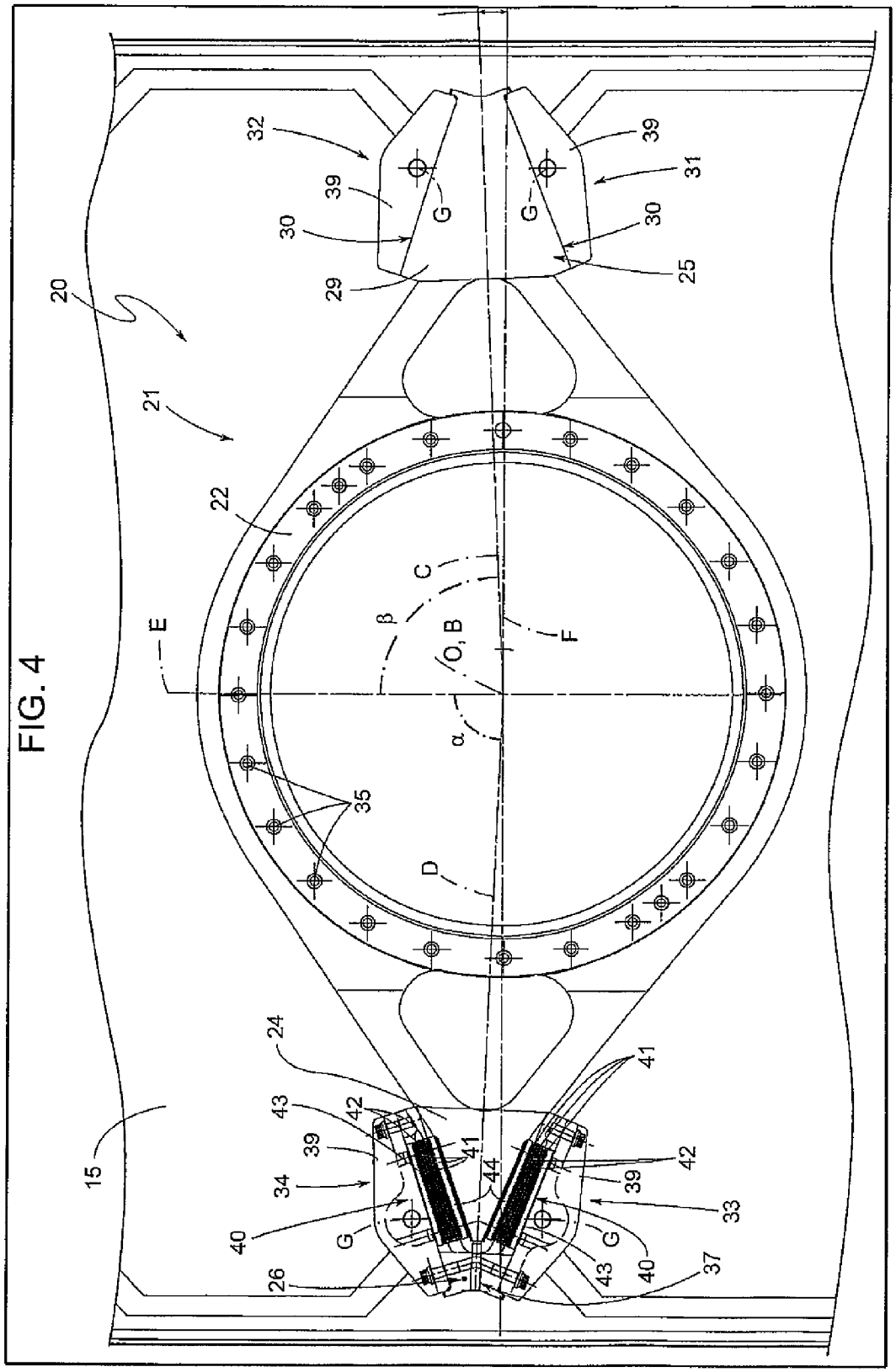
FIG. 4 shows a partly sectioned, top plan view of the FIGS. 2 and 3 connecting device.
Figure 5:
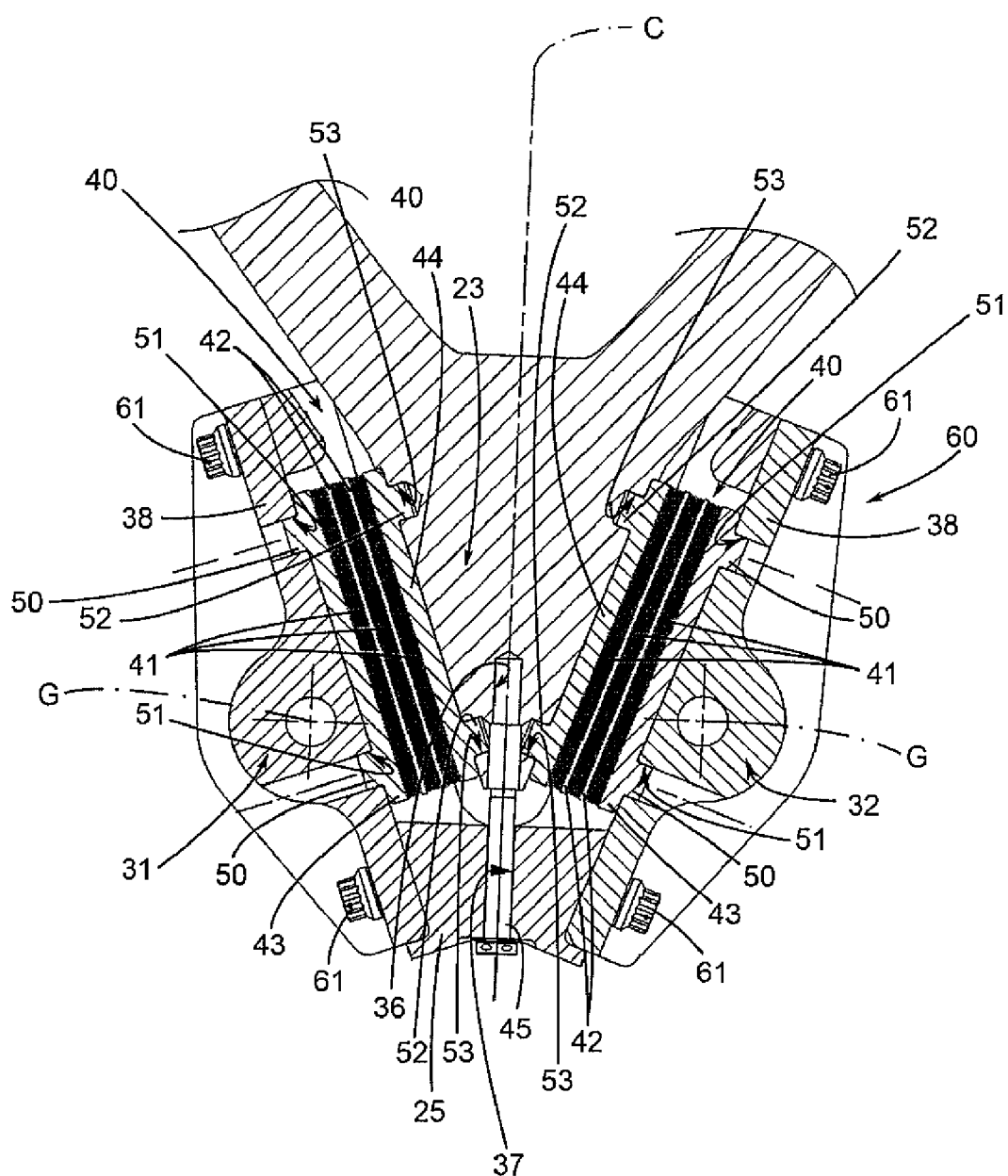
FIG. 5 shows a section, with parts removed for clarity, of part of the FIG. 2-4 connecting device.

Connecting device 20 substantially comprises (FIG. 4):

a cross member 21 in turn comprising a flange 22 bolted to the bottom edge of box 14 and defining a circular opening having an axis B and through which axis A extends; and two V-shaped appendixes 23, 24 converging on opposite sides of axis B and projecting from respective portions of flange 22 on opposite sides of axis B;

two connecting members 25, 26 located on opposite sides of axis B and each comprising two opposite plates 29 perpendicular to axis B, and two sidewalls 30 interposed perpendicularly between plates 29;

two members 31, 32 connected to wall 15 of fuselage 2 and to respective sidewalls 30 of member 25; and two members 33, 34 fixed to wall 15 of fuselage 2 and to respective sidewalls 30 of member 26.

More specifically, flange 22 comprises a number of holes 35 equally spaced about axis B and fitted through with respective bolts (not shown) fixed to the bottom edge of box 14. And axis B is inclined with respect to axis A.

Each appendix 23, 24 comprises two sides converging on the opposite side to axis B and extending symmetrically with respect to a respective axis C, D; and a threaded hole 36 (shown in FIGS. 5-8) extending along respective axis C, D and having an open first axial end located on the opposite side to axis B, and a closed second axial end opposite the first axial end.

With reference to FIGS. 6 and 7, members 25, 26 each comprise a trapezoidal seat 27 engaged by a respective appendix 23, 24; and two prismatic, rectangular-section seats 28 located on either side of seat 27 and bounded by respective sides 30. More specifically, seats 28 of each member 25, 26 communicate with relative seat 27.

Members 25, 26 have respective through holes 37 with respective axes C, D and aligned axially with holes 36 of respective appendixes 23, 24.

When assembling connecting device 20, holes 36 of respective appendixes 23 and holes 37 of respective members 25, 26 are engaged by respective threaded pins 45 extending along respective axes C, D.

Axes C, D are inclined with respect to each other, intersect at the centre O of flange 22, and define a plane perpendicular with respect to axis B.

Axes C, D define respective angles β, α with the normal-flight axis of helicopter 1 extending from tail rotor 4 to nose 5. More specifically, angles β, α are obtuse and equal.

Axis E substantially coincides with the longitudinal axis of fuselage 2, and is perpendicular to an axis F shown in FIGS. 3, 4, 6, 7 and 8.

Sidewalls 30 of member 25 are each interposed between a relative member 31, 32 and a relative side of appendix 23.

Similarly, sidewalls 30 of member 26 are each interposed between a relative member 33, 34 and a relative side of appendix 24.

Members 31, 32, 33, 34 each comprise a main wall 38 cooperating with a respective sidewall 30 of respective member 25, 26; and two parallel lateral walls 39 projecting from respective opposite end edges of wall 38, on the opposite side to relative member 25, 26.

Figure 2:
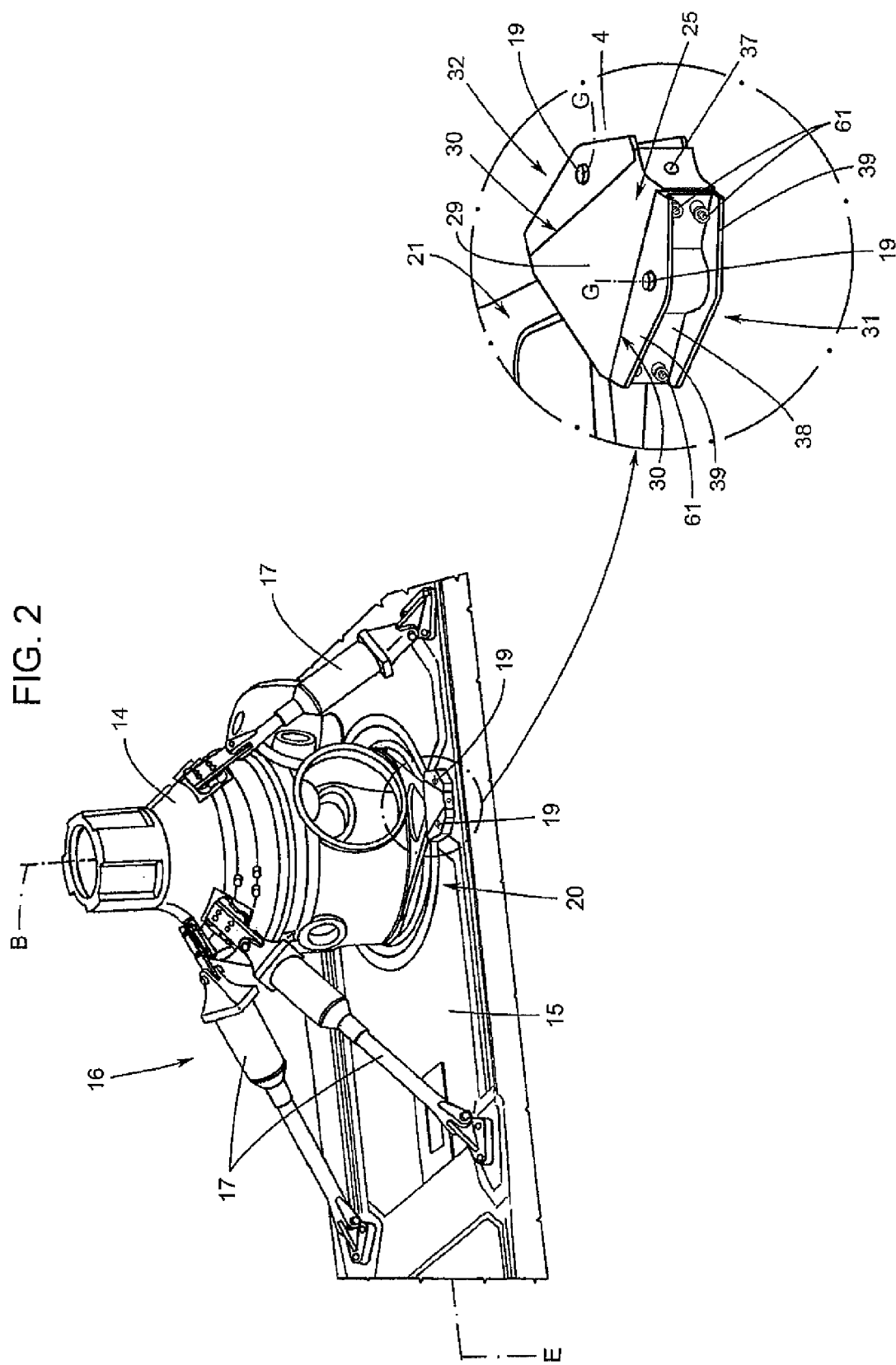
FIG. 2 shows a larger-scale view in perspective of a connecting device forming part of the FIG. 1 helicopter.
Figure 3:
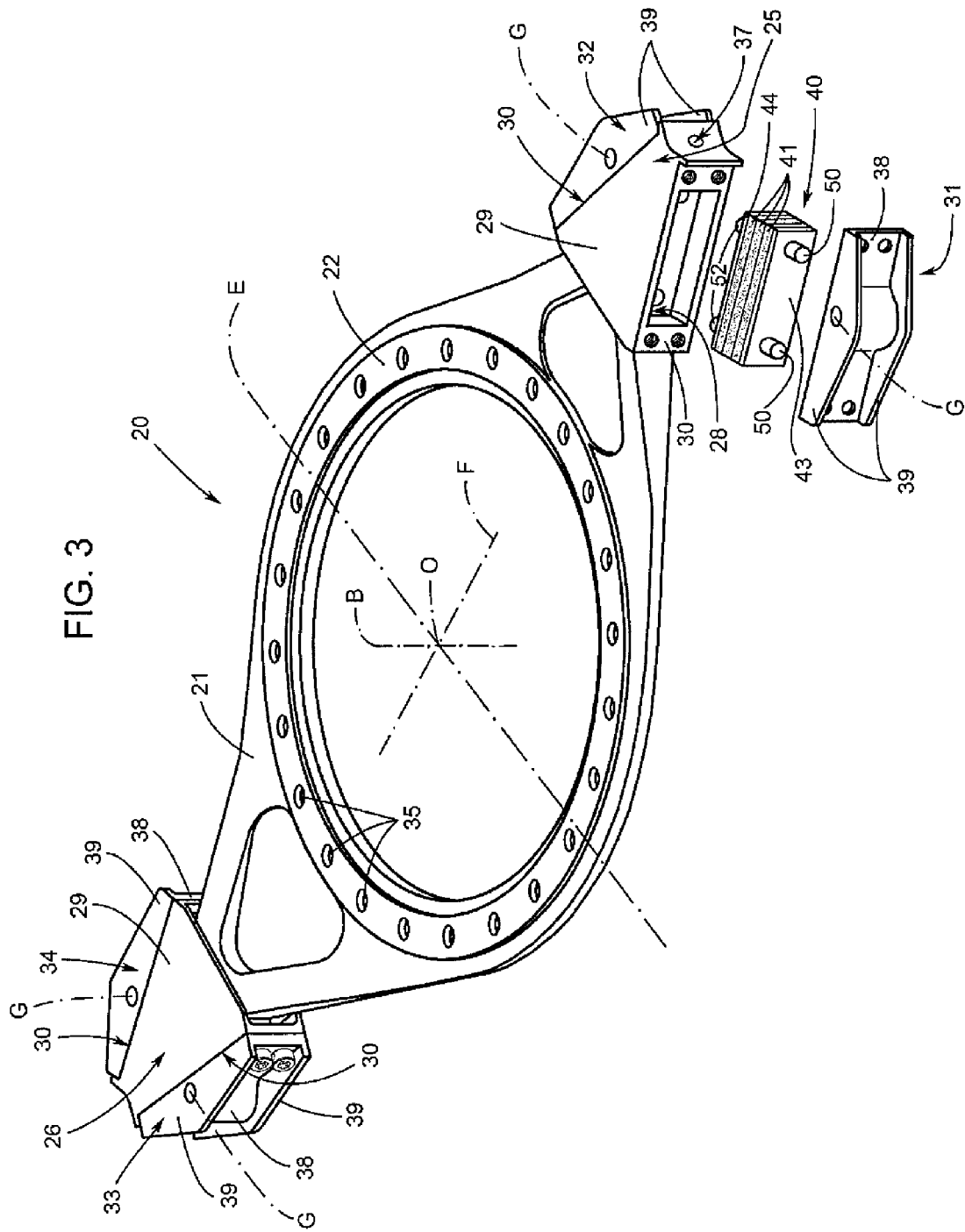
FIG. 3 shows a larger-scale, partly exploded view of the FIG. 2 connecting device.

Each member 31, 32, 33, 34 is fixed to wall 15 of fuselage 2 by a respective bolt 19 (FIG. 2) having an axis G parallel to axis B. More specifically, each bolt 19 is fitted through walls 39 and a central curved portion of wall 38 of relative member 31, 32, 33, 34.

Connecting device 20 advantageously comprises elastic means interposed between members 31, 32 and appendix 23, and between members 33, 34 and appendix 24.

More specifically, connecting device 20 comprises four damping assemblies 40 housed in respective seats 28 and each comprising a number of layers 41 of elastomeric material, in particular cured rubber, alternating with a number of plates 42 (FIGS. 4 and 5) of metal connected to layers 41 by respective layers of adhesive material not shown. In the example shown, layers 41 and plates 42 are rectangular, and lie in respective planes parallel to sidewalls 30 defining respective seats 28.

Damping assemblies 40 are interposed between respective sides of appendixes 23, 24 and respective members 31, 32, 33, 34, and so reduce transmission of vibration from cross member 21 to wall 15.

Each damping assembly 40 also comprises two plates 44, 43 made of metal and connected respectively by adhesive material to the layer 41 closest to relative axis C, D, and to the layer 41 closest to relative member 31, 32, 33, 34.

Plate 43 of each damping assembly 40 has two projections 50 projecting on the opposite side to relative appendix 23, 24 and engaging respective seats 51 (FIGS. 5, 7, 8) defined in wall 38 of relative member 31, 32, 33, 34.

Plate 44 of each damping assembly 40 has two projections 52 projecting towards relative appendix 23, 24 and engaging respective dead seats 53 (FIGS. 5, 6, 7) defined in a respective side of relative appendix 23, 24.

Projections 50, 52 of damping assemblies 40 engaging seats 28 in member 25 extend along respective axes parallel to one another and substantially perpendicular to sidewalls 30 of member 25.

Similarly, projections 50, 52 of damping assemblies 40 engaging seats 28 in member 26 extend along respective axes parallel to one another and substantially perpendicular to sidewalls 30 of member 26.

The connection between projections 50, 52 and respective seats 51, 53 provides for transmitting the torque reaction along axis B from appendixes 23, 24 to respective members 31, 32, 33, 34.

Helicopter 1 also comprises adjusting means 60 for adjusting the preload on layers 41 of damping assemblies 40 (FIGS. 5 to 8).

For each damping assembly 40, adjusting means 60 advantageously comprise (FIGS. 5 to 8):

two pairs of pins 61 having respective parallel threaded ends extending along respective axes perpendicular to relative sidewall 30 of relative member 25, 26;

two pairs of threaded holes 62 defined by relative sidewall 30 of relative member 25, 26 and engaged by respective pins 61; and two pairs of through holes 63 defined by wall 38 of relative member 31, 32, 33, 34 and fitted through with respective pins 61.

More specifically, seats 51 of each member 31, 32, 33, 34 are interposed between respective holes 63, and seat 28 housing each damping assembly 40 is interposed between relative holes 62.

FIGS. 6 to 8 show the assembly sequence of one pair of damping assemblies 40 of connecting device 20.

More specifically, FIGS. 6 to 8 show the assembly sequence of damping assemblies 40 interposed between the opposite sides of appendix 23 and respective members 31, 32.

The same also applies to assembly of damping assemblies 40 interposed between opposite sides of appendix 24 and respective members 33, 34, which is therefore not shown in detail.

More specifically, appendix 23 is inserted inside seat 27 of member 25 (FIG. 6), and threaded pin 45 is inserted through hole 37 and tightened inside threaded hole 36 (FIG. 7).

Damping assemblies 40 are then inserted inside respective seats 28 in member 25, and members 31, 32 are fixed to respective sidewalls 30 of member 25 by pins 61, so that projections 50, 52 of each damping assembly 40 engage respective seats 51, 53 defined by respective members 31, 32 and the relative sides of appendix 23.

Damping assemblies 40 are thus gripped in a predetermined position between respective members 31, 32 and the respective sides of appendix 23 (FIG. 8).

At this point, pin 45 is unscrewed from hole 36 and removed.

In actual use, engine 6 rotates drive shaft 10 of rotor 3 via transmission 7.

Shaft 10 rotates blades 12 via hub 11 to produce the lift and thrust required to lift and move helicopter 1 forward.

The lift and thrust are transmitted to box 14 and from this, mainly by rods 17, to wall 15 of fuselage 2.

By the law of action-reaction, the torque transmitted from the shaft produces a torque reaction on box 14 equal to and in the opposite direction to the torque on shaft 10.

The torque reaction travels through connecting device 20 and is transmitted to wall 15 of fuselage 2.

More specifically, the torque reaction is transmitted from appendixes 23, 24 to plates 44 of damping assemblies 40 by pins 52 engaging respective seats 53, is transmitted from plates 43 of damping assemblies 40 to corresponding members 31, 32, 33, 34 by pins 50 engaging respective seats 51, and is then transmitted by members 31, 32, 33, 34 to wall 15 of fuselage 2.

Operation of rotor 3 induces vibration on box 14.

The vibration on box 14 and the relative noise are transmitted from box 14 to flange 22 and appendixes 23, 24 of flange 22.

Because of layers 41 of elastomeric material, damping assemblies 40 oscillate to absorb this vibration and noise in predetermined frequency ranges, and to prevent them from being transmitted to members 31, 32, 33, 34 and hence to wall 15 of fuselage 2.

In other words, damping assemblies 40 isolate members 31, 32, 33, 34 connected to wall 15, from appendixes 23, 24 connected to box 14.

The preload on layers 41 is adjustable as a function of a predetermined torque on shaft 10 and, hence, torque reaction on box 14.

More specifically, the preload on layers 41 is adjusted by tightening pins 61 more or less inside respective holes 62 to adjust the gripping force on respective damping assemblies 40 in a direction substantially parallel to respective axes G.

The advantages of helicopter 1 according to the present invention will be clear from the above description.

In particular, damping assemblies 40 transmit the torque reaction from box 14 to wall 15, while reducing transmission of vibration and noise in predetermined frequency ranges to wall 15 and hence cabin 8.

That is, layers 41 of elastomeric material are interposed between cross member 21 fixed to box 14, and members 31, 32, 33, 34 fixed to wall 15 of fuselage 2, and are vibrated by the loads transmitted from box 14.

In other words, layers 41 act as respective mechanical filters which isolate wall 15 from vibration and noise transmitted in predetermined frequency ranges from box 14.

The oscillating frequency of layers 41 of connecting device 20 can be adjusted by simply altering the material or shape, i.e. adjusting the rigidity, of layers 41.

The frequency ranges in which to prevent vibration and noise transmission to fuselage 2 can thus be selected at the design stage.

In other words, damping assemblies 40 can be tuned at the design stage to different vibration and noise frequency ranges in which to reduce transmission to fuselage 2.

Adjusting means 60 also allow adjustment of the preload on damping assembly layers 41.

This therefore ensures cross member 21 is balanced when subjected to a predetermined torque reaction by box 14 and the elastic action of layers 41. The predetermined torque reaction exerted by box 14 corresponds to the torque on shaft 10 in normal flight conditions of helicopter 1.

Clearly, changes may be made to helicopter 1 as described and illustrated herein without, however, departing from the scope defined in the accompanying Claims.

The invention claimed is:

1. A helicopter comprising a rotor, a fuselage, and a transmission connected functionally to said rotor; said helicopter also comprising a supporting body supporting at least said transmission, first connecting means connected to said supporting body, second connecting means connected to said fuselage, and elastic means interposed between said first and second connecting means;

said first connecting means comprising a first connecting member having:

a flange connected to said supporting body and defining an opening with a first axis transversal to a longitudinal axis of said fuselage; and a first and second appendix projecting from respective portions of said flange on opposite sides of said first axis;

characterized in that each of said first and second appendix is V-shaped and comprises two sides converging on the opposite side to said first axis;

in that said second connecting means comprise one pair of second connecting members located on the opposite sides of said first appendix and another pair of second connecting members located on the opposite sides of said second appendix; and in that said elastic means comprise at least a pair of first elastic members interposed between the opposite sides of said first appendix and the respective second connecting members, and at least a pair of second elastic members interposed between the opposite sides of said second appendix and the respective second connecting members.

2. A helicopter as claimed in claim 1, wherein said first and second appendix have, respectively, a second and third axis of symmetry which intersect at the centre of the opening of said flange and are inclined with respect to each other and to the longitudinal axis of said fuselage.

3. A helicopter as claimed in claim 1, wherein it comprises a pair of first damping assemblies and a pair of second damping assemblies; each of said first damping assemblies comprising a number of said first elastic members alternating and integral with a number of first metal members; and each of said second damping assemblies comprising a number of said second elastic members alternating and integral with a number of second metal members.

4. A helicopter as claimed in claim 1, wherein it comprises adjusting means for adjusting the preload of said elastic means.

5. A helicopter as claimed in claim 1, wherein it further comprises, for each appendix, one body defining a central seat engaged by said appendix, and a pair of lateral seats located on either side of said central seat and at least partly housing said elastic means; said body being connected, on its opposite sides, to respective second connecting members.

6. A helicopter as claimed in claim 5, wherein said first and second appendix comprise respective threaded first holes elongated along said second and third axis respectively; said bodies comprising, in turn, respective second holes elongated respectively along said second and third axis and communicating with respective said first holes; said first holes and the respective second holes being engaged by respective threaded first pins when assembling said first and second connecting means.

7. A helicopter as claimed in claim 5, wherein said adjusting means comprise, for each second connecting member:

at least one second pin comprising a thread;

at least one third hole defined by said second connecting member and fitted through with said second pin; and at least one threaded fourth hole defined by the respective said body and engaged by said thread of said second pin.

8. A helicopter as claimed in claim 1, wherein said fuselage comprises a cabin, and a wall defining the top of said cabin; said first connecting member cooperating with said wall, and said second connecting members being fixed to said wall.

* * * * *